United States Patent
Farooq et al.

(10) Patent No.: US 12,330,577 B2
(45) Date of Patent: Jun. 17, 2025

(54) ARMREST PIVOTABLY SUPPORTED BY DOOR SIDE PANEL

(71) Applicant: Ford Global Technologies, LLC, Dearborn, MI (US)

(72) Inventors: S. M. Iskander Farooq, Novi, MI (US); Mohammad Omar Faruque, Ann Arbor, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/485,355

(22) Filed: Oct. 12, 2023

(65) Prior Publication Data
US 2025/0121792 A1 Apr. 17, 2025

(51) Int. Cl.
*B60R 21/21* (2011.01)
*B60N 2/75* (2018.01)
*B60R 21/231* (2011.01)
*B60R 21/233* (2006.01)

(52) U.S. Cl.
CPC .............. *B60R 21/21* (2013.01); *B60N 2/753* (2018.02); *B60N 2/78* (2018.02); *B60R 21/23138* (2013.01); *B60R 21/233* (2013.01)

(58) Field of Classification Search
CPC . B60R 21/21; B60R 21/23138; B60R 21/233; B60N 2/753; B60N 2/78
See application file for complete search history.

(56) References Cited

U.S. PATENT DOCUMENTS

| | | | |
|---|---|---|---|
| 5,324,072 A | 6/1994 | Olson et al. | |
| 7,552,940 B2 | 6/2009 | Lindemann et al. | |
| 8,360,465 B1 | 1/2013 | Nelson et al. | |
| 8,651,515 B2 | 2/2014 | Baba et al. | |
| 9,139,153 B2 | 9/2015 | Deng et al. | |
| 10,525,925 B2 | 1/2020 | Deng et al. | |
| 11,541,837 B2 | 1/2023 | Lee et al. | |
| 2005/0052005 A1* | 3/2005 | Lunt | B60R 21/23138 280/730.2 |
| 2018/0186306 A1* | 7/2018 | Fitzpatrick | B60J 5/0413 |

FOREIGN PATENT DOCUMENTS

| | | | | |
|---|---|---|---|---|
| DE | 102007017075 B4 * | 3/2012 | | B60R 21/21 |
| DE | 102015015870 A1 * | 6/2016 | | B60N 2/78 |
| EP | 1637409 A2 * | 3/2006 | | B60R 21/21 |
| EP | 1698525 A1 * | 9/2006 | | B60R 13/02 |
| JP | H0747841 A * | 8/1993 | | |

* cited by examiner

*Primary Examiner* — Karen Beck
(74) *Attorney, Agent, or Firm* — Frank A. MacKenzie; Brooks Kushman P.C.

(57) ABSTRACT

A vehicle includes a door side panel. An armrest extends from a first end to a second end. The armrest is pivotably supported by the door side panel at the first end and the armrest is releasably connected to the door side panel at the second end. An airbag is inflatable from an uninflated position to an inflated position. The airbag is positioned between the armrest and the door side panel in the uninflated position to pivot the armrest from a lowered position to a raised position as the airbag inflates from the uninflated position to the inflated position.

20 Claims, 7 Drawing Sheets

ARMREST PIVOTABLY SUPPORTED BY DOOR SIDE PANEL

BACKGROUND

A vehicle door includes at least one door panel, e.g., an inner panel and an outer panel, and a door-trim panel mounted to the door panel. The door panel in some examples is metal, such as steel or aluminum and the door-trim panel faces a passenger compartment of the vehicle. The door-trim panel can be aligned with the vehicle occupant seated next to the vehicle door.

In some examples, an airbag may be mounted to the vehicle door and is inflatable along a side of an occupant, specifically along the torso, hip and/or head of the occupant. The airbag, for example, may be inflatable between the occupant and the vehicle door. The airbag controls the kinematics of the occupant in vehicle impacts that urge the occupant in a cross-vehicle direction, e.g., a certain side impacts.

DETAILED DESCRIPTION

Figure 1:
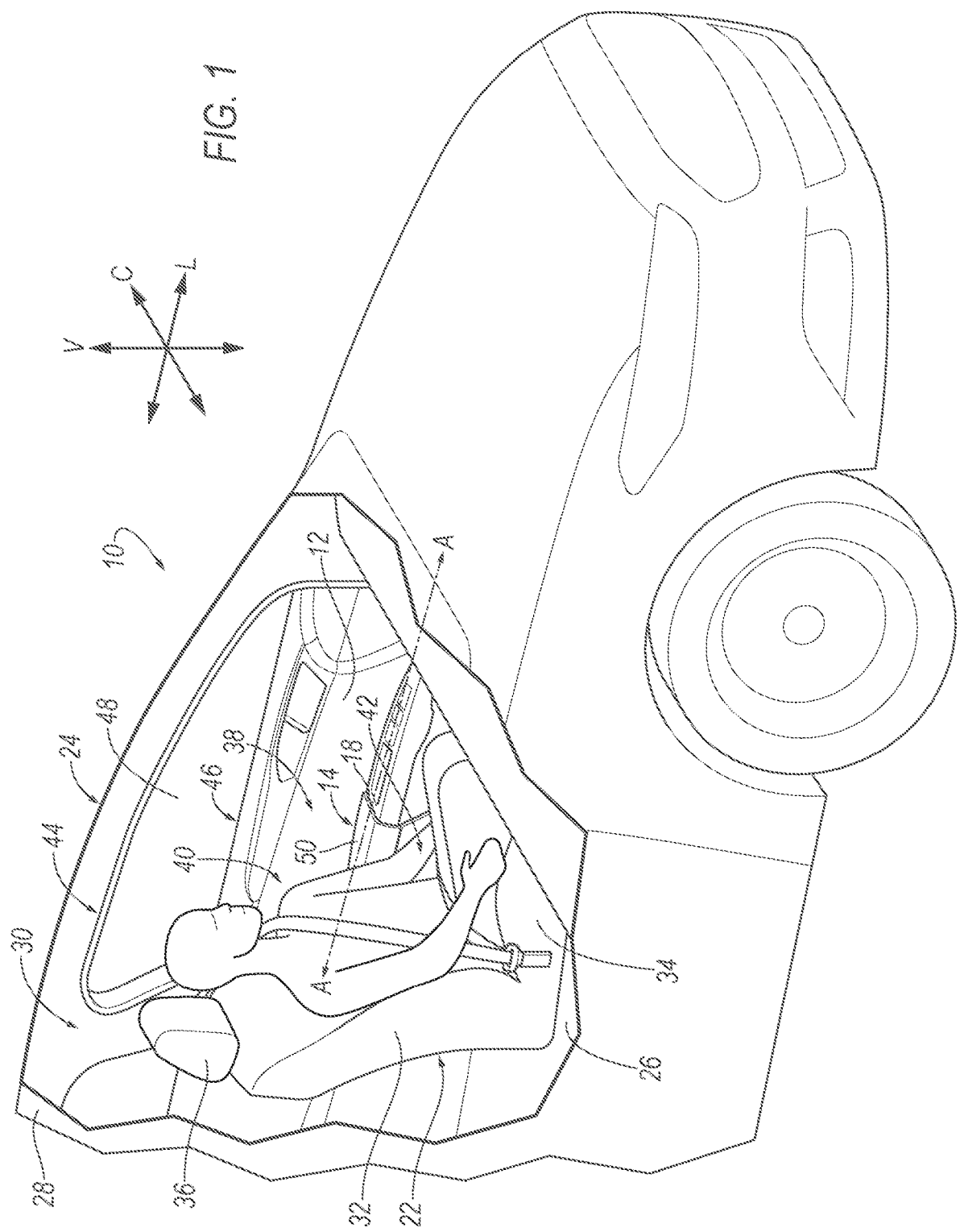
FIG. 1 is a perspective view of a vehicle having a door side panel.

A vehicle includes a door side panel. An armrest extends from a first end to a second end. The armrest is pivotably supported by the door side panel at the first end and the armrest is releasably connected to the door side panel at the second end. An airbag is inflatable from an uninflated position to an inflated position. The airbag is positioned between the armrest and the door side panel in the uninflated position to pivot the armrest from a lowered position to a raised position as the airbag inflates from the uninflated position to the inflated position.

The first end of the armrest may be pivotable about an axis elongated cross-vehicle.

The door side panel may define a hinge elongated along the axis. The first end may be pivotably supported by and pivotable about the hinge.

The armrest may be elongated along a vehicle-longitudinal axis when the armrest is in the lowered position.

The airbag may be supported by the door side panel between the first end and the second end of the armrest.

The vehicle may include a fastener between the second end of the armrest and the door side panel. The fastener may be releasable as the airbag inflates from the uninflated position to the inflated position.

The door side panel may define a hinge elongated cross-vehicle. The first end of the armrest may be pivotably supported by and pivotable about the hinge and the hinge may be spaced from the fastener along the armrest.

The door side panel may define a hinge. The first end of the armrest may be pivotably supported by and pivotable about the hinge.

The armrest may be elongated along a vehicle-longitudinal axis when the armrest is in the lowered position and the armrest may be elongated along a second axis when the armrest is in the raised position. The second axis may be transverse to the vehicle-longitudinal axis.

The second end may be moveable away from the door side panel as the armrest moves from the lowered position to the raised position.

The door side panel may define a first axis and a second axis transverse to the first axis. The first end may be fixed relative the first axis and the second axis and the second end may be moveable relative to the first axis and the second axis.

The armrest may be elongated along the first axis in the lowered position and the armrest may be transverse to the first axis in the raised position.

The airbag may include a first inflation chamber extending upwardly relative to the armrest and the airbag may include a second inflation chamber extending downwardly relative to the armrest.

The vehicle may include a vehicle seat. The airbag may be inflatable between the door side panel and the vehicle seat.

The vehicle seat may define an occupant-thorax area and an occupant-pelvic area. The airbag may be between the occupant-thorax area and the door side panel and the airbag may be between the occupant-pelvic area and the door side panel.

The airbag may include a first inflation chamber extending upwardly relative to the armrest and the airbag may include a second inflation chamber extending downwardly relative to the armrest. The first inflation chamber may be between the occupant-thorax area and the door side panel and the second inflation chamber may be between the occupant-pelvic area and the door side panel.

The first end may be supported by the door side panel when the airbag is in the uninflated position and when the airbag is in the inflated position.

The first end may be vehicle-rearward of the second end.

The armrest may define an upper surface elongated from the first end to the second end. The upper surface may extend vehicle-inboard of the door side panel.

The upper surface may be spaced upwardly from the airbag and the upper surface may be rotatable relative to the airbag.

With reference to the Figures, wherein like numerals indicate like parts throughout the several views, a vehicle 10 includes a door side panel 12. An armrest 14 extends from a first end 16 to a second end 18. The armrest 14 is pivotably supported by the door side panel 12 at the first end 16 and the armrest 14 is releasably connected to the door side panel 12 at the second end 18. An airbag 20 is inflatable from an uninflated position to an inflated position. The airbag 20 is positioned between the armrest 14 and the door side panel 12 in the uninflated position to pivot the armrest 14 from a lowered position to a raised position as the airbag 20 inflates from the uninflated position to the inflated position.

In the event of certain vehicle impacts, the airbag 20 inflates to the inflated position. As the airbag 20 inflates to the inflated position, the inflation of the airbag 20 releases the second end 18 of the armrest 14 and the armrest 14 moves to the raised position. The inflation of the airbag 20 applies a force to the armrest 14 to release the second end 18.

After the second end 18 is released, the airbag 20 continues to move to the inflated position and the airbag 20 continues to move the armrest 14 to the raised position. The movement of the armrest 14 to the raised position allows the airbag 20 to fully inflate to the inflated position adjacent an occupant of a seat 22 of the vehicle 10. The armrest 14 moves away from the door side panel 12 to allow the airbag 20 to inflate between the occupant and the door side panel 12.

With reference to FIG. 1, the vehicle 10 may be any suitable type of ground vehicle, e.g., a passenger or commercial automobile such as a sedan, a coupe, a truck, a sport utility, a crossover, a van, a minivan, a taxi, a bus, etc. Operations, systems, and methods described herein should always be implemented and/or performed in accordance with an applicable owner's/user's manual and/or safety guidelines.

The vehicle 10 defines a vehicle-longitudinal axis L extending between a front vehicle end (not numbered) and a rear vehicle end (not numbered) of the vehicle 10. The vehicle 10 defines a cross-vehicle axis C extending cross-vehicle from one side to the other side of the vehicle 10. The cross-vehicle direction C is parallel to the cross-vehicle axis C. The vehicle 10 defines a vertical axis V. The vehicle-longitudinal axis L, the cross-vehicle axis C, and the vertical axis V are perpendicular relative to each other.

As described further below, the vehicle 10 includes a vehicle body 24 including rockers (not numbered), roof rails (not numbered), roof beams (not shown), pillars (not numbered), body panels (not numbered), a vehicle floor 26, a vehicle roof 28, etc. The vehicle 10 includes a passenger compartment 30 to house occupants of the vehicle 10. The passenger compartment 30 may extend across the vehicle 10, i.e., from one side to the other side of the vehicle 10. The passenger compartment 30 includes a front end (not numbered) and a rear end (not shown) with the front end being in front of the rear end during forward movement of the vehicle 10.

The vehicle body 24, specifically, the vehicle roof 28, includes at least two roof rails (not shown). The roof rails are cross-vehicle spaced from each other along the cross-vehicle axis C. The roof rails each extend longitudinally along the vehicle body 24, i.e., along the vehicle-longitudinal axis L of the vehicle body 24. The vehicle body 24 may include any suitable number of roof rails spaced from one another and extending longitudinally along the vehicle body 24.

The vehicle roof 28 and the vehicle floor 26 are spaced from each other. Specifically, the vehicle floor 26 is spaced downwardly from the vehicle roof 28. The vehicle roof 28 defines the upper boundary of the passenger compartment 30 and may extend from the front end of the passenger compartment 30 to the rear end of the passenger compartment 30. The vehicle roof 28 may include a roof panel (not numbered) extending from one roof rail to the other roof rail. The roof panel may be irremovably fixed to the roof rails. In other words, the roof panel is secured to the roof rails in such a way that removal requires destruction such as cutting, e.g., cutting material and/or welded joints, etc. As an example, the roof panel may be attached to both roof rails, e.g., by welding, fasteners, etc.

The vehicle 10 includes the vehicle floor 26 defining the lower boundary of the passenger compartment 30 and may extend from the front end of the passenger compartment 30 to the rear end of the passenger compartment 30. The vehicle floor 26 may include upholstery, for example, carpet, and may have a class-A surface facing the passenger compartment 30, i.e., a surface specifically manufactured to have a high quality, finished, aesthetic appearance free of blemishes.

With reference to FIGS. 1, 2, 4, and 5, the vehicle 10 may include one or more vehicle seats 22, hereinafter referred to as "seats 22." Specifically, the vehicle 10 may include any suitable number of seats 22. The seats 22 are supported by the vehicle floor 26. In other words, the vehicle floor 26 bears the weight of the seats 22. The seats 22 may be arranged in any suitable arrangement in the passenger compartment 30. As in the example shown in the Figures, one or more of the seats 22 may be at the front end of the passenger compartment 30, e.g., a driver seat and/or a passenger seat, i.e., front seats. In other examples, one or more of the seats 22 may be behind the front end of the passenger compartment 30, e.g., at the rear end of the passenger compartment 30, i.e., rear seats. The seats 22 may be movable relative to the vehicle floor 26 to various positions, e.g., movable fore-and-aft and/or cross-vehicle. The seat 22 may be of any suitable type, e.g., a bucket seat.

The seats 22 include a seatback 32, a seat bottom 34, and a head restraint 36. The head restraint 36 may be supported by and extending upwardly from the seatback 32. The head restraint 36 may be stationary or movable relative to the seatback 32. The seatback 32 may be supported by the seat bottom 34 and may be stationary or movable relative to the seat bottom 34. The seatback 32, the seat bottom 34, and the head restraint 36 may be adjustable in multiple degrees of freedom. Specifically, the seatback 32, the seat bottom 34, and the head restraint 36 may themselves be adjustable. In other words, adjustable components within the seatback 32, the seat bottom 34, and the head restraint 36 may be adjustable relative to each other.

The seat 22 defines an occupant-seating area 38 of the seat 22. The occupant-seating area 38 is the area occupied by an occupant when properly seated on the seat bottom 34 and the seatback 32. The occupant-seating area 38 is in a seat-forward direction of the seatback 32 and above the seat bottom 34.

The occupant-seating area 38 may include an occupant-thorax area 40 and an occupant-pelvic area 42. Specifically, the seat 22 defines an occupant-thorax area 40 and an occupant-pelvic area 42. In the example shown in the Figures, the occupant-thorax area 40 and the occupant-pelvic area 42 are vehicle-forward of the seatback 32 of the seat 22. The occupant-thorax area 40 is the volume typically occupied by the thorax, i.e., the chest, of the occupant in the seat 22 of the vehicle 10. The occupant-pelvic area 42 is the volume typically occupied by the pelvis of the occupant in the seat 22 of the vehicle 10.

The vehicle 10 includes a plurality of doors 44 openable for vehicle occupants to enter and exit the passenger compartment 30. Each of the doors 44 are adjacent one of the seats 22 in the vehicle 10. For example, each of the front seats and each of the rear seats may be adjacent a door 44 of the vehicle 10. Specifically, each front seat 22 may be adjacent a front door 44 and each rear seat (not shown) may be adjacent a rear door (not shown). The doors 44 are vehicle-outboard from each of the front seats 22 and each of the rear seats.

The roof rails contact a top edge (not numbered) of the doors 44 when the doors 44 are closed. Each door 44 includes at least one door panel (not numbered) and a door-trim panel 46 supported on the door panel. Specifically, the door panel may include two panels, namely a door inner (not shown) and a door outer (not shown). In such an example, the door-trim panel 46 and the door outer are fixed to the door inner. The door-trim panel 46 is positioned opposite the door outer relative to the door frame. The door-trim panel 46 is inboard relative to the door inner, and the door outer is outboard relative to the door inner. The door 44 includes a window opening (not numbered) that may be completely closed by a window 48 if the window 48 is in a fully raised position. The window opening is defined by the door-trim panel 46 and door outer on a bottom edge and either by the door inner circumscribing the window opening or by the vehicle body 24, e.g., a front pillar, a middle pillar, and the roof rail. The door outer faces outboard relative to the vehicle 10.

The door outer may define a portion of the exterior of the vehicle 10. For example, the door outer may present a class-A surface, i.e., a surface specifically manufactured to have a high-quality, finished aesthetic appearance free of blemishes. The door outer may be metal, e.g., steel, aluminum, etc., polymeric, e.g., fiber reinforced plastic composite, etc., or any other suitable material.

The door inner may be metal, e.g., steel, aluminum, etc., polymeric, e.g., fiber reinforced plastic composite, etc., or any other suitable material. The door inner provides structural rigidity for the door outer. The door inner may provide a mounting location for components of the door 44.

With reference to FIGS. 1-6, the door-trim panel 46 may include a number of different components. For example, the door-trim panel 46 includes the door side panel 12, the armrest 14, various buttons and/or electronics, and any other suitable number and type of components. The door-trim panel 46 may include a covering (not shown) supported by the door side panel 12 and/or any other component of the door-trim panel 46. The covering may include upholstery, padding, etc. The upholstery may be cloth, leather, faux leather, or any other suitable material. The upholstery may be stitched in panels around the door side panel 12. The padding may be between the covering and the door side panel 12 and may be foam or any other suitable material. The door-trim panel 46, e.g., the door side panel 12 and the armrest 14, may include a material suitable for an interior of the vehicle 10, such as vinyl, plastic, leather, wood, etc.

The door side panel 12 defines a first axis A and a second axis B. The first axis A extends along the vehicle-longitudinal axis L. In other words, the first axis A and the vehicle-longitudinal axis L are parallel with each other. The second axis B is transverse to the first axis A and the vehicle-longitudinal axis L.

The armrest 14 is supported by the door side panel 12. In other words, the door side panel 12 bears the weight of the armrest 14. The armrest 14 is moveable from the lowered position to the raised position. Specifically, the armrest 14 is pivotable from the lowered position to the raised position relative to the door side panel 12. The armrest 14 is in the lowered position during operation of the vehicle 10. For example, the armrest 14 may be used for an occupant of the occupant-seating area 38 to rest their arm that is most vehicle-outboard during operation of the vehicle 10, e.g., driving. In other words, the armrest 14 may be at a height that the occupant of the occupant-seating area 38 may use the armrest 14 during operation of the vehicle 10. The armrest 14 may define an upper surface 50 on which an occupant may rest their arm. The upper surface 50 extends vehicle-inboard of the door side panel 12. In other words, the upper surface 50 extends away from the door side panel 12 and toward the occupant-seating area 38. In the event of certain vehicle impacts, the armrest 14 pivots to the raised position. Specifically, as discussed further below, as the airbag 20 inflates to the inflated position, the armrest 14 pivots to the raised position.

Figure 3:
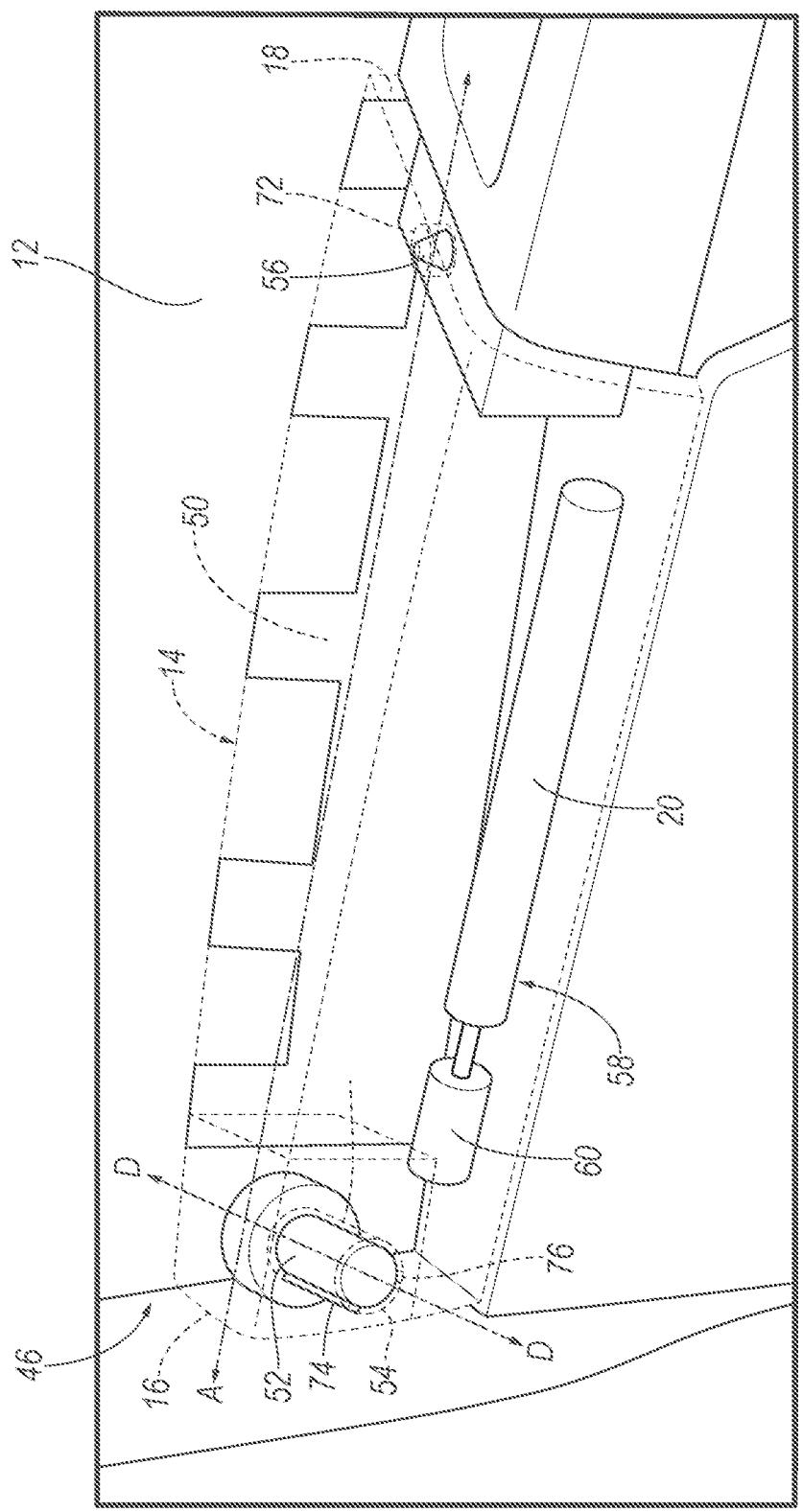
FIG. 3 is a perspective view of the door side panel with the armrest in a lowered position.

With reference to FIG. 3, the armrest 14 includes the first end 16 and the second end 18 spaced from the first end 16. The armrest 14 extends from the first end 16 to the second end 18. Specifically, the armrest 14 is elongated from the first end 16 to the second end 18. The upper surface 50 extends from the first end 16 to the second end 18 of the armrest 14. Specifically, the upper surface 50 is elongated rim the first end 16 to the second end 18. In the lowered position, the first end 16 of the armrest 14 is vehicle-rearward of the second end 18. Specifically, the first end 16 of the armrest 14 is spaced vehicle-rearward of the second end 18 in the lowered position. When the armrest 14 is in the lowered position, the armrest 14 is elongated along the vehicle-longitudinal axis L. In other words, the armrest 14 is elongated along the first axis A when the armrest 14 is in the lowered position. The armrest 14 is elongated from the first end 16 to the second end 18 along the vehicle-longitudinal axis L and the first axis A.

The armrest 14 is supported by the door side panel 12. In other words, the door side panel 12 bears the weight of the armrest 14. Specifically, the armrest 14 is pivotably supported by the door side panel 12. The armrest 14 is pivotably supported by the door side panel 12 at the first end 16. In other words, the first end 16 of the armrest 14 is pivotably supported by the door side panel 12. The first end 16 of the armrest 14 is pivotable about a third axis D that extends cross-vehicle. Specifically, the first end 16 of the armrest 14 is pivotable about the third axis D that extends along the cross-vehicle axis C. The third axis D extends parallel to the cross-vehicle axis C. The armrest 14 rotates about the third axis to rotate the second end 18 vehicle-rearward. The armrest 14 pivots from the lowered position to the raised position in the event of certain vehicle impacts where the airbag 20 moves to the inflated position. As the airbag 20 inflates, the armrest 14 pivots to the raised position.

The door side panel 12 may define a hinge 52 about which the armrest 14 is pivotable. In the example shown in the Figures, the hinge 52 protrudes vehicle-inboard from the door side panel 12. The hinge 52 is elongated cross-vehicle. Specifically, the hinge 52 is elongated along the third axis D. Specifically, the hinge 52 is elongated along the cross-vehicle axis C. The hinge 52 is spaced along the first axis A and the vehicle-longitudinal axis L from the second end 18 of the armrest 14.

The first end 16 is pivotably supported by the hinge 52. In other words, the first end 16 of the armrest 14 is pivotably connected to the hinge 52 such that the armrest 14 pivots about the hinge 52 from the lowered position to the raised position. The hinge 52 bears the weight of the first end 16. In the example shown in the Figures, the armrest 14 defines a hole 54 that receives the hinge 52. The hole 54 may be elongated along the third axis D to allow the armrest 14 to pivot about the third axis D. The hinge 52 may be concealed between the armrest 14 and the door side panel 12 when the armrest 14 is in the lowered position. The hinge 52 may be adjacent the airbag 20 between the door side panel 12 and the armrest 14 when the armrest 14 is in the lowered position.

The armrest 14 is releasably connected to the door side panel 12 at the second end 18. In other words, the second end 18 of the armrest 14 is releasable relative to the door side panel 12. Specifically, as discussed further below, as the airbag 20 moves toward the inflated position, the second end 18 releases from door side panel 12 to allow the airbag 20 to move fully to the inflated position. The door-trim panel 46 may include a fastener 56 between the second end 18 of the armrest 14 and the door side panel 12 when the armrest 14 is in the lowered position. The fastener 56 may engage an opening 72 in the armrest 14 to maintain the armrest 14 in the lowered position during operation of the vehicle. As the airbag 20 inflates, the fastener 56 is releasable relative to the door side panel 12. As the airbag 20 inflates, the airbag 20 applies a force to the armrest 14 to overcome the fastener 56. In other words, the fastener 56 is releasable at a predetermined force, and, when the inflation of the airbag 20 reaches the predetermined force, the fastener 56 releases. Specifically, the fastener 56 is not electronically actuated, but rather the fastener 56 releases when the force of the airbag 20 inflation overcomes the predetermined force of the fastener 56. In other words, the fastener 56 releases from the armrest 14 to allow the armrest 14 to pivot relative to the door side panel 12 when the airbag 20 moves to the inflated position. The hinge 52 is spaced along the first axis A and the vehicle-longitudinal axis L from the fastener 56. The fastener 56 may be any suitable type of fastener that is releasable, e.g., a push pin, a Christmas Tree clip, etc.

Figure 2:
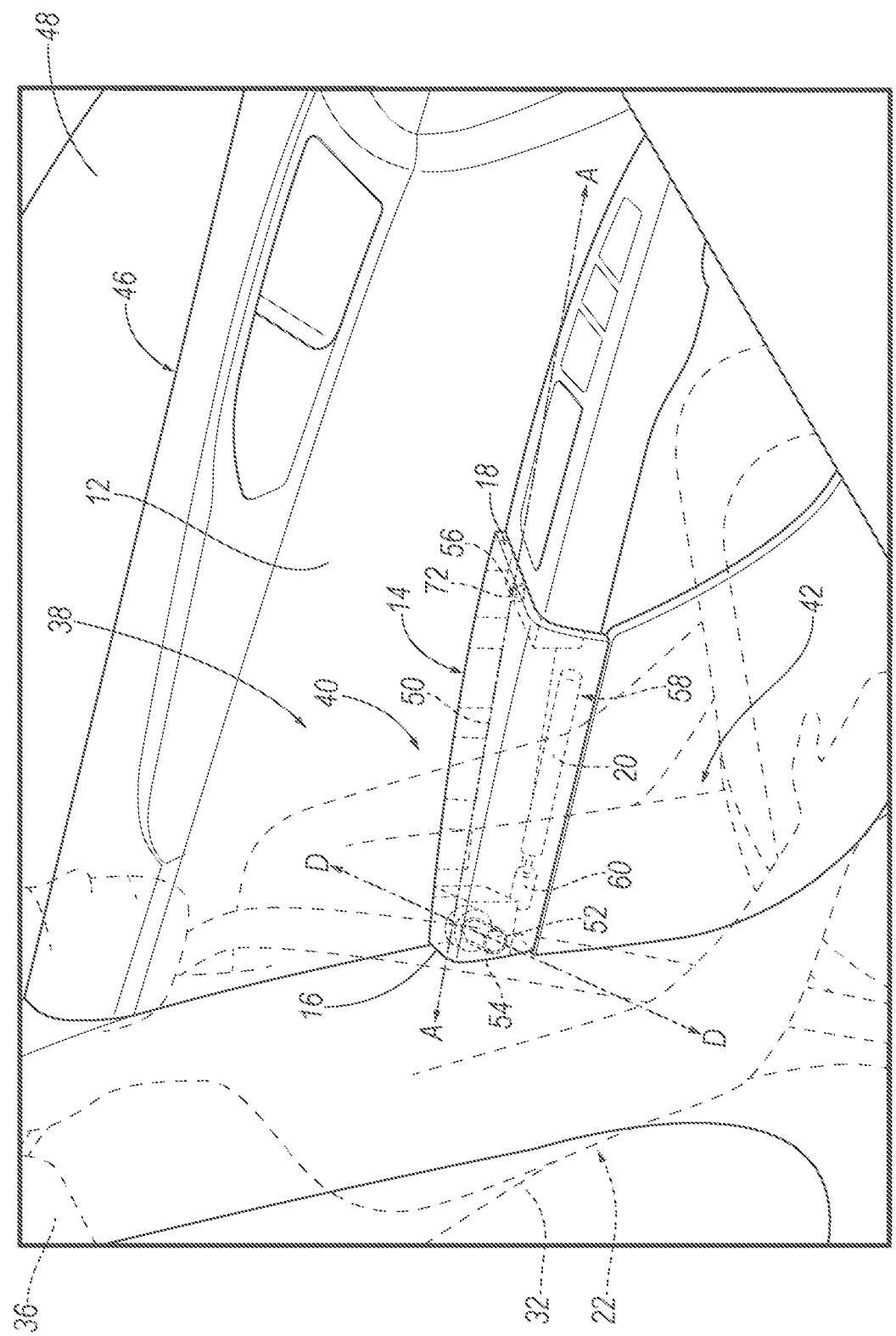
FIG. 2 is a perspective view of the door side panel and an armrest supported by the door side panel.
Figure 6:
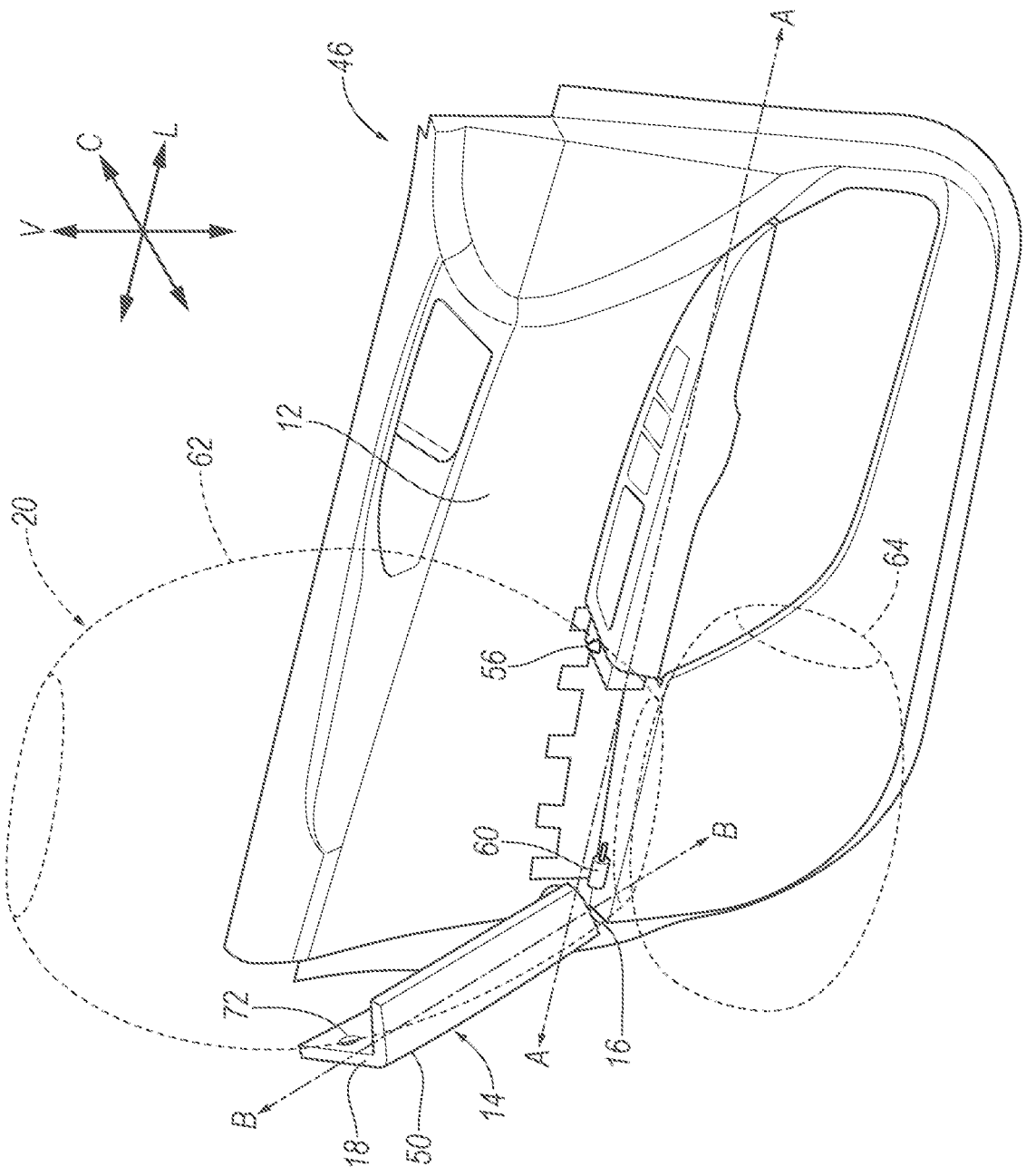
FIG. 6 is a perspective view of a portion of the door side panel with the armrest in a raised position and the airbag in the inflated position.

With reference to FIGS. 2, 3, and 6, the hinge 52 may include a stop 74 that may be engaged when the armrest 14 reaches the raised position. The stop 74 may contact a portion of the hole 54, e.g., a notch 76, when the armrest 14 reaches the raised position. As the armrest 14 rotates from the lowered position to the raised position, the notch 76 may rotate about the hinge 52 until the armrest 14 reaches the raised position. Once in the raised position, the stop 74 contacts the notch 76 to allow the armrest 14 to extend along the second axis B. The stop 74 and notch 76 may be of any suitable type. In some examples, not shown in the Figures, the stop 74 and the notch 76 may lock to maintain the armrest 14 in the raised position. In such examples, the stop 74 and notch 76 may be of any suitable type, e.g., a rib and catch, a cam, etc.

The first end 16 is fixed relative to the first axis A and the second axis B. In other words, the first end 16 of the armrest 14 does not translate relative to the first axis A and the second axis B. The first end 16 of the armrest 14 does not translate in any direction along the door side panel 12. The first end 16 is supported by the door side panel 12 when the airbag 20 is in the uninflated position and when the airbag 20 is in the inflated position. In other words, the first end 16 of the armrest 14 remains supported by the door side panel 12 despite the second end 18 being releasable from the door side panel 12.

As the armrest 14 moves to the raised position, the second end 18 of the armrest 14 is moveable relative to the door side panel 12. Specifically, the second end 18 is moveable relative to the first axis A and the second axis B once the second end 18 is released from the door side panel 12. The second end 18 is moveable away from the door side panel 12 as the armrest 14 moves from the lowered position to the raised position. Specifically, the second end 18 of the armrest 14 moves away from the door side panel 12 as the armrest 14 pivots about the first end 16 to the raised position. The second end 18 moves in an arc trajectory away from the door side panel 12. In other words, the second end 18 moves upwardly from the door side panel 12 and vehicle-rearward. Specifically, the second end 18 moves upwardly and vehicle-rearwardly relative to the second axis B and the second end 18 moves vehicle-rearwardly relative to the first axis A and the vehicle-longitudinal axis L. Once the armrest 14 reaches the raised position, the armrest 14 is elongated along the second axis B. In other words, the armrest 14 is transverse to the first axis A in the raised position. The first end 16 is spaced from the second end 18 along the second axis B when the armrest 14 is in the raised position.

With reference to FIGS. 2-6, an airbag assembly 58 may be supported by one or more of the door-trim panels 46. Specifically, the airbag assembly 58 is fixed to the door-trim panel 46. In other words, the door-trim panel 46 bears the weight of the airbag assembly 58. The airbag assembly 58 includes the airbag 20, an inflator 60, and may include a housing (not shown). The airbag 20 is inflatable from the uninflated position to the inflated position. The vehicle 10 may include any suitable number of airbag assemblies 58. As one example, one airbag assembly 58 may be supported by each of the door-trim panels. In examples including more than one airbag assembly 58, e.g., an airbag assembly 58 supported by each of the door-trim panels, the airbag assemblies 58 may be identical or substantially identical to each other.

The inflator 60 is fluidly connected to the airbag 20. The inflator 60 expands the airbag 20 with inflation medium, such as a gas, to move the airbag 20 from the uninflated position to the inflated position. The inflator 60 may be, for example, a pyrotechnic inflator that ignites a chemical reaction to generate the inflation medium, a stored gas inflator that releases (e.g., by a pyrotechnic valve) stored gas as the inflation medium, or a hybrid. In the example shown in the Figures, the inflator 60 is supported by the door side panel 12 between the armrest 14 and the door side panel 12. In other examples, the inflator 60 may be supported by any suitable component of the vehicle 10.

As discussed above, the airbag assembly 58, i.e., the airbag 20, is supported by the door-trim panel 46. Specifically, the airbag 20 is supported by the door side panel 12. The airbag 20 is fixed to the door side panel 12. The airbag 20 may be fixed to the door side panel 12 in any suitable way, e.g., fasteners, clips, adhesive, etc. The airbag 20 is positioned on the door side panel 12 between the armrest 14 and the door side panel 12 when the armrest 14 is in the lowered position. In other words, the armrest 14 is between the airbag 20 and the remainder of the passenger compartment 30 such that the armrest 14 conceals the airbag 20 in the uninflated position. The upper surface 50 is spaced upwardly from the airbag 20. The airbag 20 is supported by the door side panel 12 between the first end 16 and the second end 18 of the armrest 14 in the uninflated position.

The airbag 20 is positioned between the armrest 14 and the door side panel 12 in the uninflated position to pivot the armrest 14 from the lowered position to the raised position as the airbag 20 inflates from the uninflated position to the inflated position. In other words, as the airbag 20 moves toward the inflated position, the airbag 20 inflation pivots the armrest 14 from the lowered position to the raised position. As the airbag 20 moves toward the inflated position, the second end 18 of the armrest 14 releases from the door side panel 12 and the armrest 14 is allowed to move to the raised position. The upper surface 50 is rotatable relative to the airbag 20. In other words, as the airbag 20 moves to the inflated position, the upper surface 50 rotates upwardly and away from the airbag 20. The armrest 14 being in the raised position allows the airbag 20 to move to the inflated position. In the inflated position, the airbag 20 may control the kinematics of the occupant in the occupant-seating area 38 of the seat 22 adjacent the door 44.

In the inflated position, the airbag 20 is inflatable between the seat 22 and the door-trim panel 46. Specifically, in the inflated position, the airbag 20 is between the seat 22 and the door side panel 12. In other words, the airbag 20 is between the door side panel 12 and the occupant-seating area 38 of the seat 22. As discussed further below, different portions of the airbag 20 may be between different portions of the airbag 20 and the door side panel 12. The airbag 20 may control the kinematics of the occupant of the occupant-seating area 38 in the event of certain vehicle impacts.

Figure 4:
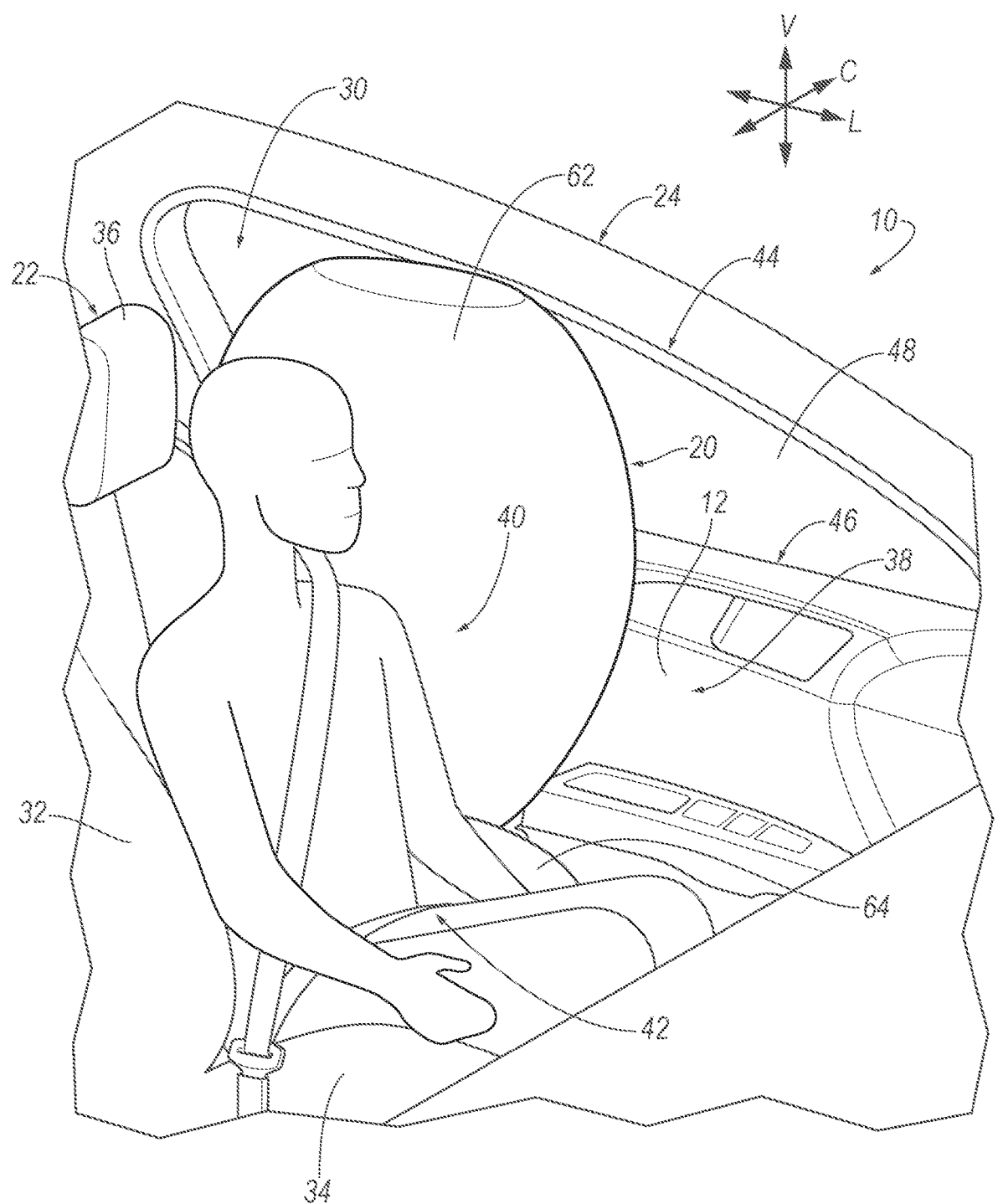
FIG. 4 is a perspective view of the door side panel and an airbag supported by the door side panel in an inflated position.
Figure 5:
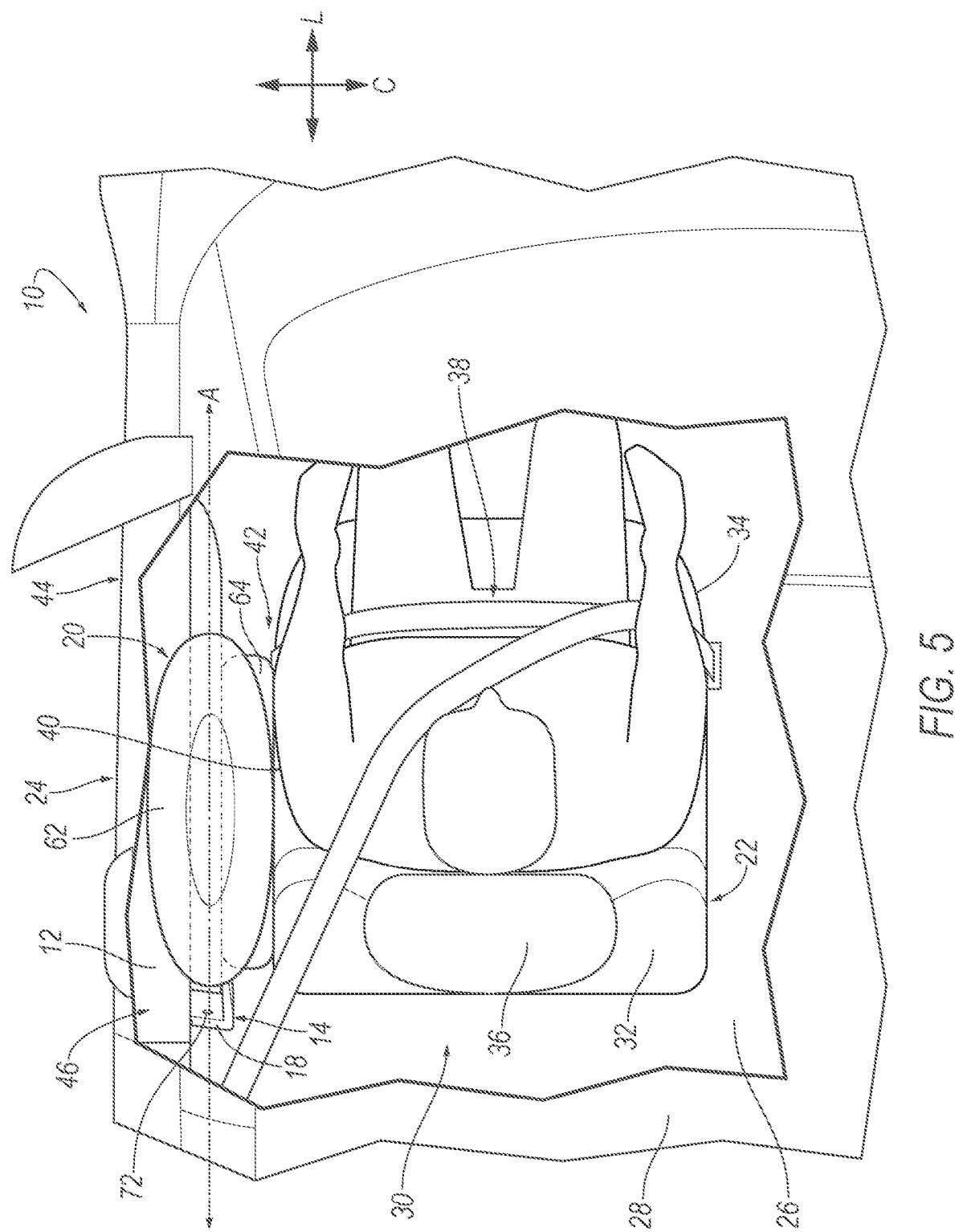
FIG. 5 is a plan view of the vehicle with the airbag in the inflated position.

With reference to FIGS. 4-6, the airbag 20 includes a first inflation chamber 62 and a second inflation chamber 64. In the inflated position, the first inflation chamber 62 and the second inflation chamber 64 extend from the door side panel 12 in opposite directions. Specifically, the first inflation chamber 62 extends upwardly relative to the armrest 14 and the second inflation chamber 64 extends downwardly relative to the armrest 14. The first inflation chamber 62 may be between an upper portion of the door side panel 12 and the occupant-seating area 38 and the second inflation chamber 64 may be between a lower portion of the door side panel 12 and the occupant-seating area 38.

The first inflation chamber 62 may be between the door side panel 12 and the occupant-thorax area 40 defined by the seat 22. Specifically, the first inflation chamber 62 is sized and shaped to extend between the door side panel 12 and the occupant-thorax area 40, i.e., the area occupied by the thorax of the occupant in the seat 22. The first inflation chamber 62 controls the kinematics of an occupant seated in the seat 22 of the vehicle 10, i.e., an occupant occupying the occupant-thorax area 40 defined by the seat 22 in the passenger compartment 30.

The second inflation chamber 64 may be between the door side panel 12 and the occupant-pelvic area 42 defined by the seat 22. Specifically, the second inflation chamber 64 is sized and shaped to extend between the door side panel 12 and the occupant-pelvic area 42, i.e., the area occupied by the pelvis of the occupant in the seat 22. The second inflation chamber 64 controls the kinematics of the occupant seated in the seat 22 of the vehicle 10, i.e., an occupant occupying the occupant-pelvic area 42 defined by the seat 22 in the passenger compartment 30.

The airbag 20, including the first inflation chamber 62 and the second inflation chamber 64, may be fabric, e.g., a woven polymer. For example, the fabric may be woven nylon yarn, for example, nylon 6, 6. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

Figure 7:
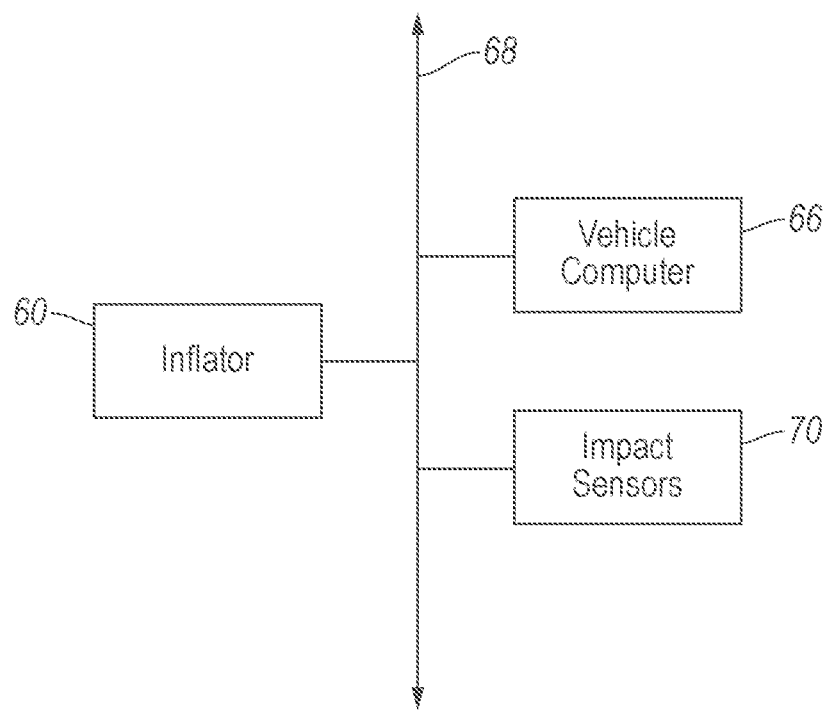
FIG. 7 is a block diagram of a vehicle communication network of the vehicle.

With reference to FIG. 7, the vehicle 10 includes a vehicle computer 66 including a processor and a memory storing instructions executable by the processor. The memory includes one or more forms of computer readable media, and stores instructions executable by the vehicle computer 66 for performing various operations, including as disclosed herein. The vehicle computer 66 may be a restraints control module. The vehicle computer 66 can be a generic computer with the processor and the memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the vehicle computer 66 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 66.

The vehicle computer 66 is generally arranged for communications on a vehicle communication network 68 that can include a bus in the vehicle 10 such as a controller area network CAN or the like, and/or other wired and/or wireless mechanisms. Alternatively or additionally, in cases where the vehicle computer 66 actually comprises a plurality of devices, the vehicle communication network 68 may be used for communications between devices represented as the vehicle computer 66 in this disclosure. Further, as mentioned below, various controllers and/or sensors may provide data to the vehicle computer 66 via the vehicle communication network 68.

With continued reference to FIG. 7, the vehicle 10 may include at least one impact sensor 70 for sensing certain vehicle impacts (e.g., impacts of a certain magnitude, direction, etc.). The vehicle computer 66 is in communication with the impact sensor 70 and the inflator 60. The vehicle computer 66 may activate the inflator 60, e.g., provide an impulse to a pyrotechnic charge of the inflator 60 when the impact sensor 70 senses certain vehicle impacts to move the airbag 20 to the inflated position. The impact sensor 70 may be configured to sense certain vehicle impacts prior to impact, i.e., pre-impact sensing. The impact sensor 70 may be in communication with the vehicle computer 66. The impact sensor 70 is configured to detect certain vehicle impacts. In other words, a "certain vehicle impact" is an impact of the type and/or magnitude for which the airbag 20 is designed to inflate, i.e., "certain" indicates the type and/or magnitude of the impact. The type and/or magnitude of such "certain vehicle impacts" may be prestored in the vehicle computer 66, e.g., a restraints control module and/or a body control module. The impact sensor 70 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 70 may be located at numerous points in or on the vehicle 10.

In the event of certain vehicle impacts, the impact sensor 70 may detect the vehicle impact. Based on the identification of the certain vehicle impact, the vehicle computer 66 may send a signal to the inflator 60 to move the airbag 20 to the inflated position. As the airbag 20 moves to the inflated position, the second end 18 of the armrest 14, e.g., the fastener 56, releases and the armrest 14 rotates to the raised position. The airbag 20 inflates between the seat 22 and the door side panel 12 to control the kinematics of the occupant of the seat 22.

The disclosure has been described in an illustrative manner, and it is to be understood that the terminology which has been used is intended to be in the nature of words of description rather than of limitation. The numerical adjectives "first" and "second" are used herein merely as identifiers and do not signify order or importance. Many modifications and variations of the present disclosure are possible in light of the above teachings, and the disclosure may be practiced otherwise than as specifically described.

What is claimed is:

1. A vehicle comprising:
a door side panel;
an armrest extending from a first end to a second end, the armrest being pivotably supported by the door side panel at the first end and the armrest being releasably connected to the door side panel at the second end; and
an airbag inflatable from an uninflated position to an inflated position;
the airbag being positioned between the armrest and the door side panel in the uninflated position to pivot the armrest from a lowered position to a raised position as the airbag inflates from the uninflated position to the inflated position; and
the first end of the armrest being pivotable about an axis elongated cross-vehicle.

2. The vehicle of claim 1, wherein the door side panel defines a hinge elongated along the axis, the first end being pivotably supported by and pivotable about the hinge.

3. The vehicle of claim 1, wherein the armrest is elongated along a vehicle-longitudinal axis when the armrest is in the lowered position.

4. The vehicle of claim 1, wherein the airbag is supported by the door side panel between the first end and the second end of the armrest.

5. The vehicle of claim 1, further comprising a fastener between the second end of the armrest and the door side panel, the fastener being releasable as the airbag inflates from the uninflated position to the inflated position.

6. The vehicle of claim 5, wherein the door side panel defines a hinge elongated cross-vehicle, the first end of the armrest being pivotably supported by and pivotable about the hinge and the hinge being spaced from the fastener along the armrest.

7. The vehicle of claim 1, wherein the door side panel defines a hinge, the first end of the armrest being pivotably supported by and pivotable about the hinge.

8. The vehicle of claim 1, wherein the armrest is elongated along a vehicle-longitudinal axis when the armrest is in the lowered position and the armrest is elongated along a second axis when the armrest is in the raised position, the second axis being transverse to the vehicle-longitudinal axis.

9. The vehicle of claim 1, wherein the second end is moveable away from the door side panel as the armrest moves from the lowered position to the raised position.

10. The vehicle of claim 1, wherein:
the door side panel defines a first axis and a second axis transverse to the first axis, the first end being fixed relative to the first axis and the second axis and the second end being moveable relative to the first axis and the second axis; and
the armrest is elongated along the first axis in the lowered position and the armrest is transverse to the first axis in the raised position.

11. The vehicle of claim 1, wherein the airbag includes a first inflation chamber extending upwardly relative to the armrest and the airbag includes a second inflation chamber extending downwardly relative to the armrest.

12. The vehicle of claim 1, further comprising a vehicle seat, the airbag being inflatable between the door side panel and the vehicle seat.

13. The vehicle of claim 12, wherein the vehicle seat defines an occupant-thorax area and an occupant-pelvic area, the airbag being between the occupant-thorax area and the door side panel and the airbag being between the occupant-pelvic area and the door side panel.

14. The vehicle of claim 13, wherein the airbag includes a first inflation chamber extending upwardly relative to the armrest and the airbag includes a second inflation chamber extending downwardly relative to the armrest, the first inflation chamber being between the occupant-thorax area and the door side panel and the second inflation chamber being between the occupant-pelvic area and the door side panel.

15. The vehicle of claim 1, wherein the first end is supported by the door side panel when the airbag is in the uninflated position and when the airbag is in the inflated position.

16. The vehicle of claim 1, wherein the first end is vehicle-rearward of the second end.

17. The vehicle of claim 1, wherein the armrest defines an upper surface elongated from the first end to the second end, the upper surface extending vehicle-inboard of the door side panel.

18. The vehicle of claim 17, wherein the upper surface is spaced upwardly from the airbag and the upper surface is rotatable relative to the airbag.

19. A vehicle comprising:
a door side panel;
an armrest extending from a first end to a second end, the armrest being pivotably supported by the door side panel at the first end and the armrest being releasably connected to the door side panel at the second end;
an airbag inflatable from an uninflated position to an inflated position;
the airbag being positioned between the armrest and the door side panel in the uninflated position to pivot the armrest from a lowered position to a raised position as the airbag inflates from the uninflated position to the inflated position; and
a fastener between the second end of the armrest and the door side panel, the fastener being releasable as the airbag inflates from the uninflated position to the inflated position;
the door side panel defining a hinge elongated cross-vehicle, the first end of the armrest being pivotably supported by and pivotable about the hinge and the hinge being spaced from the fastener along the armrest.

20. A vehicle comprising:
a door side panel;
an armrest extending from a first end to a second end, the armrest being pivotably supported by the door side panel at the first end and the armrest being releasably connected to the door side panel at the second end; and
an airbag inflatable from an uninflated position to an inflated position;
the airbag being positioned between the armrest and the door side panel in the uninflated position to pivot the armrest from a lowered position to a raised position as the airbag inflates from the uninflated position to the inflated position; and
the first end being vehicle-rearward of the second end.

* * * * *